Oct. 21, 1952        L. H. TINKER        2,615,077
ELECTRICAL PROBE
Filed March 31, 1949        2 SHEETS—SHEET 1
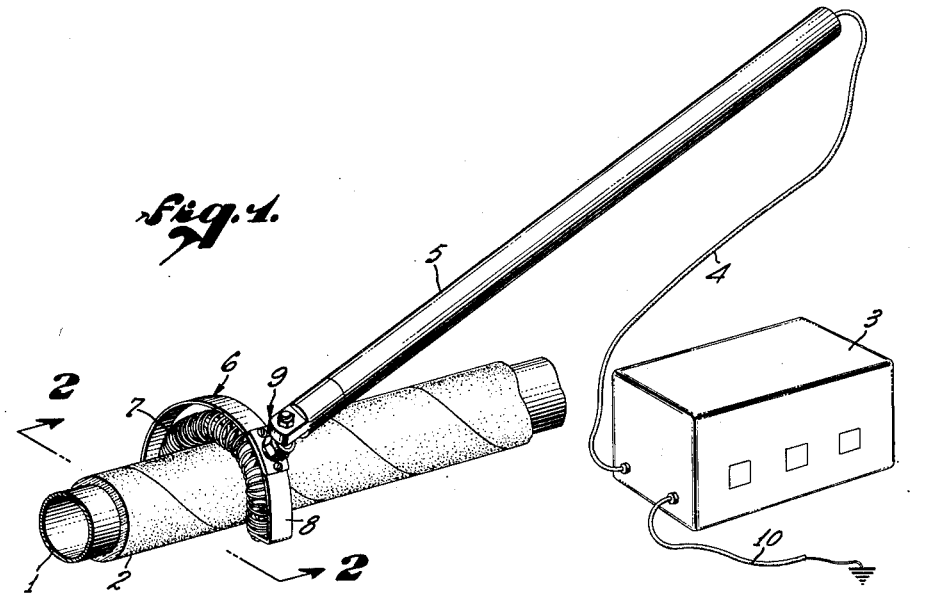
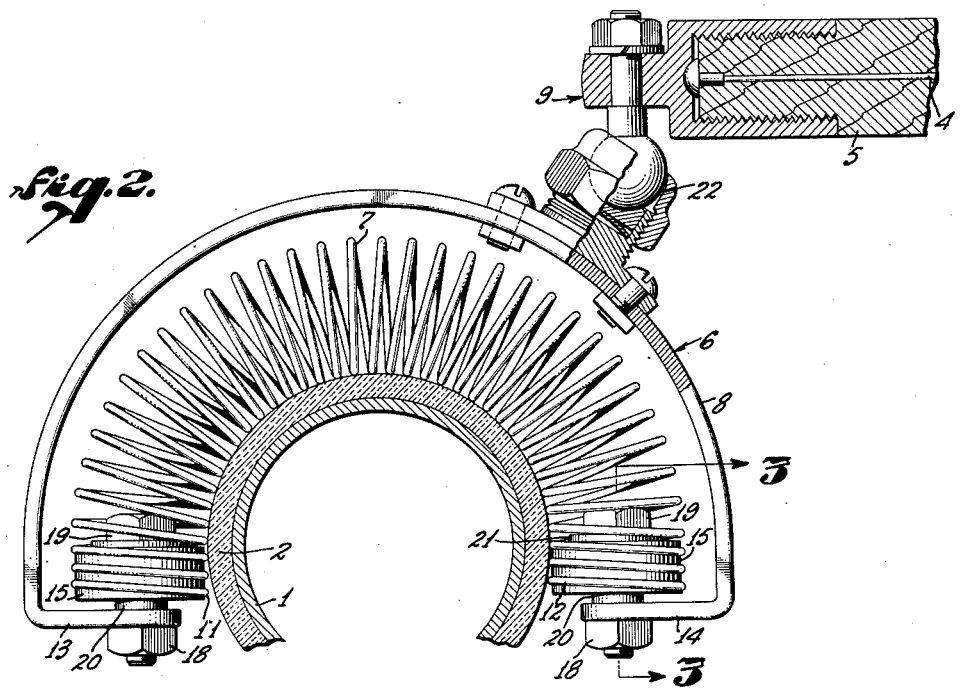
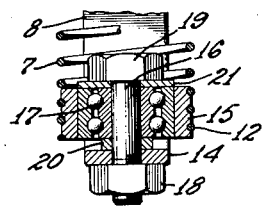
LEO H. TINKER,
INVENTOR.
BY
Gerald H. Peterson
ATTORNEY.

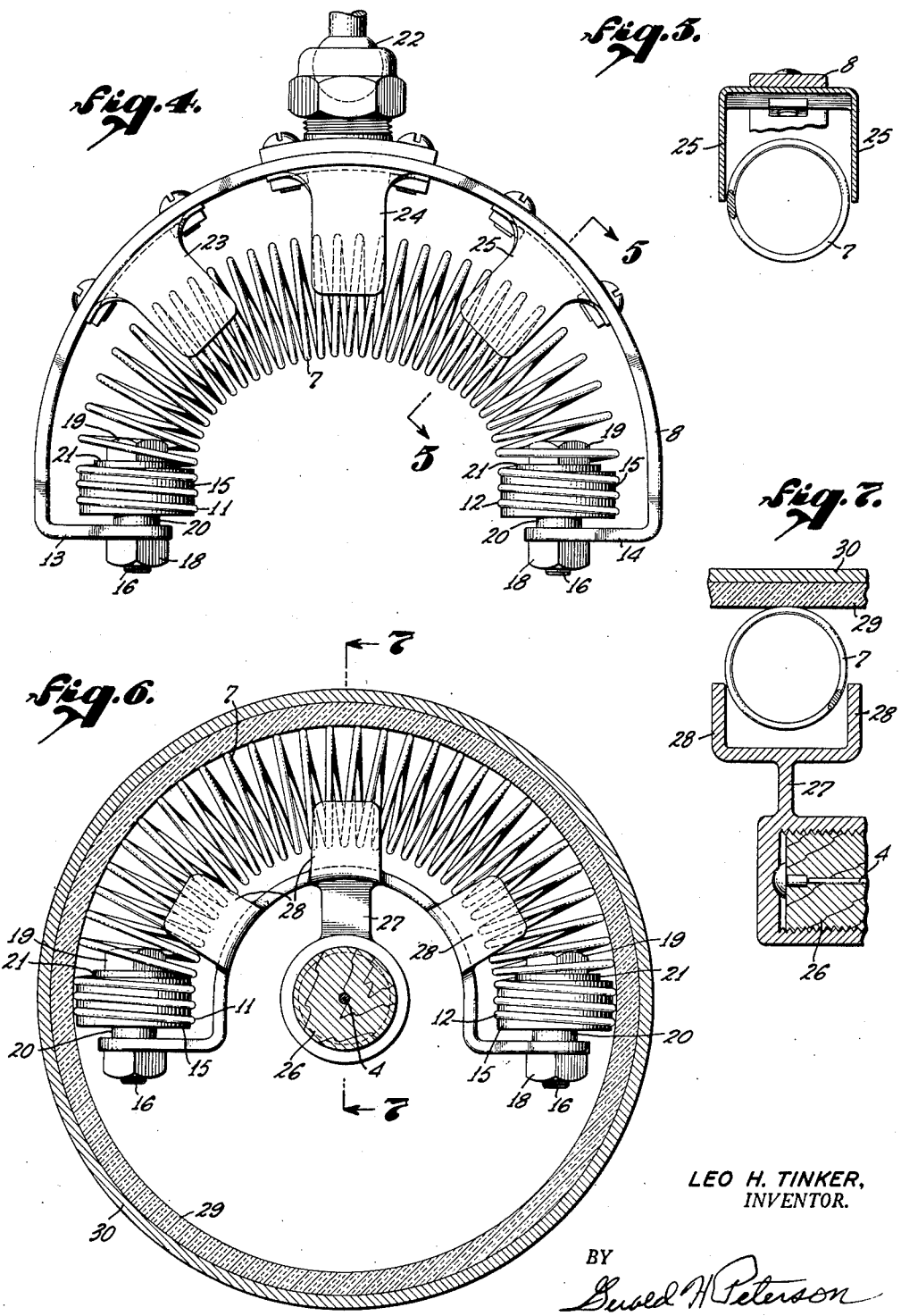

Patented Oct. 21, 1952

2,615,077

UNITED STATES PATENT OFFICE 2,615,077

ELECTRICAL PROBE

Leo H. Tinker, San Gabriel, Calif.

Application March 31, 1949, Serial No. 84,710

14 Claims. (Cl. 175—183)

This invention relates to an insulation testing device and particularly to such a device for testing the coating on a pipe and more particularly to an electrical probe for applying a high electrical potential to such coating being tested.

In the construction of natural gas and petroleum transmission and distribution lines, it is common practice to coat steel pipe with one or more layers of tar and paper or pipe-line enamel to protect the pipe from the corrosive effects of ground water and cathodic currents which might be developed between the ground and the steel pipe. It is therefore important to test these coatings with a device which will indicate any imperfections in the coating where water might come in contact with the steel pipe after being embedded in the ground. These imperfections are usually caused by minute openings in the coating which can be caused by air bubbles, shrinkage cracks, or, in the case of asphalt coating material, specks of coke or silica, and are not readily visible to the eye and must be detected by other means.

Usually, such pipe coating is tested by the application of a high electrical potential applied across the coating between the steel of the pipe and an electrode probe for applying the electrical potential to the coating being tested. Electrical devices for producing the electrical potential used for testing are known to the art.

My application relates more particularly to an electrical probe for readily applying the high electrical potential used for test to the pipe coating.

It is an object of this invention to provide a means which can be readily moved along a pipe line, the coating of which is being tested, and which will provide an electrical probe effective to apply the test voltage to a substantial area of the pipe line as it is moved therealong.

It is another object of my invention to provide such an electrical probing device which will not injure the coating on the pipe line while testing.

Other objects and advantages of this invention will be readily apparent from the following description taken in conjunction with the accompanying drawings.

Specific embodiments of my invention will now be described in connection with the accompanying drawings.

Figure 1 shows generally the arrangement of a probing device of my invention in use for testing a pipe coating.

Figure 2 shows a side view partly in section of a probe made in accordance with my invention.

Figure 3 shows a cross-section of Figure 2 taken on the line 3—3.

Figure 4 shows a modification of my probing device in general similar to the showing in Figure 2.

Figure 5 shows a cross-section of Figure 4 taken on line 5—5.

Figure 6 shows a modification of my device for testing the insulation or coating on the inside of a cylindrical member such as a pipe.

Figure 7 is a cross-section of Figure 6 taken on line 7—7.

Referring particularly to the drawings, numeral 1 indicates a steel pipe having a coating 2 thereon. At 3 is shown an electrical device for generating a high electrical potential used for test which is electrically connected by way of line 4 through the handle 5 to the probe of my invention shown generally at 6. This probe comprises essentially a coiled helical spring 7 extended part way about the circumference of the coated pipe, for example, an arc of about 185°, rotatably supported at its two ends on the prongs or shoes of a supporting yoke 8 which, in turn, is adjustably affixed to the handle 5 by adjustable supporting means 9. This supporting yoke 8 may be resilient so that the supports for the two ends of the spring may be sprung apart somewhat to allow application of the probe to a pipe of somewhat larger diameter than that on which the probe will fit with the yoke in normal position. The yoke, of course, should be sufficiently strong to firmly hold the spring in position while moving it along the pipe being tested. The electrical test circuit is completed by virtue of the fact that pipe 1 is grounded and lead line 10 is connected to ground, or, of course, if desired, lead line 10 could be connected directly to the metal 1 of the pipe.

The detail of this embodiment of a probe made in accordance with my invention is shown in Figures 2 and 3. At 7 is a helical spring adapted to be applied or contacted to a convenient portion of the circumference of the pipe being tested. Usually this will be an arc of about 185°, so that the whole circumference of the pipe can be tested by two applications. However, it will be understood that a probe made in accordance with my invention can be constructed to encompass any desired somewhat larger or smaller portion of the circumference of a pipe being tested, although the portion of the circumference should not be so large that it cannot be readily applied to and taken from the pipe being tested. The helical spring 7 is rotatably affixed at each of its ends 11 and 12 to the shoes or prongs 13 and 14 of the supporting yoke 8 by affixing each end of the helical spring to a supporting wheel or roller 15 which rotates about shaft 16, preferably on a ball bearing assembly 17. Shaft 16 is affixed to prong 14 as by nuts 18 and 19. The arrangement preferably has spacers 20 and 21 which also act as thrust washers.

The yoke 8 may be affixed to a handle 5, preferably by an adjustable means such as a ball-and-socket coupling shown at 22.

In operation, the high electrical potential used for testing the coating is applied across the coating 2 between the rotatable helical spring 7 and the metal pipe 1. From the handle of the device, the helical spring 7 may be readily rolled along the length of the pipe and as it does so it effectively applies the high test voltage preferably to a little over one-half of the circumference of the pipe. The whole area of the pipe may then be covered by first running the device on one side of the pipe and then on the other. This probe is very convenient, easy to handle and apply, and is very effective in operation. Because the spring is flexible it will adapt itself to irregularities of the surface.

For a probe made in accordance with my invention which is large enough to be applied to pipes of relatively large diameter, or, in the event the helical spring tends to fall out of position, guides or positioning elements 23, 24 and 25 may be provided on the yoke 8 to hold the spring substantially in the proper position. Such a modification is shown in Figures 4 and 5, which is substantially the same as that shown in Figures 2 and 3 except that depending guides 23, 24 and 25 are arranged and adapted to hold the spring in position just inside and substantially in a line with the yoke. It will be apparent that instead of the spaced elements 23, 24 and 25, a substantially continuous element may be arranged depending from each side of the yoke and extending substantially the full length thereof. Such depending guides should, of course, be sufficiently long to hold the spring in position and sufficiently short not to interfere with the free contact of the spring with the surface being tested. If desired, rollers may be arranged between the inner surfaces of such guides and the spring to provide a rolling contact between such guides and the sides of the spring.

It will also be apparent that the probe made in accordance with my invention can be adapted to shapes other than those having a circular cross-section, although the arrangement shown in the drawing is particularly adapted for pipes having a circular cross-section. The probe may have any curvature, however, including a straight line or a zero curvature and a curve the reverse of that shown in Figure 2; that is, the probe may be shaped to be applied to a flat surface or to the inside of a pipe, for example.

Figures 6 and 7 show an arrangement which is substantially the reverse of that shown in Figure 2 for testing the coating 29 on the inside of a cylindrical element such as a metal pipe 30. In this arrangement the helical spring 7 is rotatably supported at its two ends as in the arrangement shown in Figures 2 and 3, but the arrangement is such that the outer surface of the spring fits the inside of the pipe in contact with the coating 29. The probe has a handle 26 to which is attached elements 27 which in turn support guiding elements 28 for holding the spring 7 in position. These guiding elements may not be necessary in the event the spring is strong enough to support itself, but with this arrangement for testing the inside of a pipe, some such guiding elements will usually be found desirable. It is preferable that the yoke be resilient to make it possible to fit pipe having diameters of somewhat different size and to readily ride over irregularities on the inside of the pipe.

It will be understood that the specific embodiments of my invention described above are intended to illustrate and exemplify my invention and are not necessarily intended as a limitation thereon and that modifications of my invention may be made within the scope of the following claims which define the invention sought to be covered by Letters Patent.

I claim:

1. An electrical probing device for applying a testing potential along the surface of a coated pipe comprising a coiled helical spring rotatably supported at its two ends upon a supporting means which holds said coiled spring in a configuration adapted to fit substantially and extend only partially around the cylindrical surface of said pipe.

2. An electrical probing device for applying a testing potential along the surface of a coated pipe comprising a yoke having a projection at each of its ends, a coiled helical spring with its two ends rotatably supported on said projections, said coiled spring extending between said two projections of said yoke in an arc substantially fitting the curvature of the pipe surface to be tested and extending only part way around the circumference thereof so that said spring can be applied to and removed from the surface thereof.

3. An electrical probing device for applying a testing potential along the outer surface of a coated pipe comprising a yoke having inwardly extending projections at each of its ends, a coiled helical spring having its two ends rotatably supported on said projections so that said coiled spring is rotatably held within said yoke and extends between said two projections in an arc approximating the curvature of the pipe coating to be tested and extends only part way around the circumference of the pipe, and means connected to said yoke for moving said yoke and coiled spring along the surface of said coated pipe.

4. A device as defined in claim 3 in which each end of said coiled spring is affixed to a wheel rotatably supported on a shaft affixed to each of said projections.

5. A device as defined in claim 3 in which said yoke has guides extending from each side of said yoke over said coiled spring to hold it in position.

6. An electrical probing device for applying a testing potential along the inner surface of a coated pipe comprising a yoke having an outwardly extending projection at each of its ends, a coiled helical spring having its two ends rotatably supported on said projections so that said coiled spring is rotatably held about said yoke and extends between said two projections in an arc approximating the curvature of the pipe coating to be tested, and extends only part way around the inner circumference of the pipe, and means connected to said yoke for moving said yoke and coiled spring through the inside of said pipe.

7. A device as defined in claim 6 in which each end of said coiled spring is affixed to a wheel rotatably supported on a shaft affixed to each of said projections.

8. A device as defined in claim 6 in which said yoke has guides extending from each side of said yoke over said coiled spring to hold it in position.

9. In a device for applying an electrical potential axially along the surface of a cylindrical object comprising an arcuate yoke member adapted to extend along a portion of the circumferential surface of such a cylindrical object, said yoke member having two ends, contact means rotatably affixed to each of said ends of said yoke member extending between said two ends and adapted to contact a portion of the surface of said cylindrical object and to rotate thereupon as it is moved axially therealong, both said yoke member and said contact member extending only through an arc such that said contact member can be applied to and taken away from said cylindrical object without being substantially obstructed thereby.

10. An electrical probing device for applying a testing potential along the surface of a coated pipe comprising a coiled helical spring having two ends, a supporting means for holding said coiled spring at said two ends in a configuration adapted to fit substantially about a portion of the circumference of the cylindrical surface of the pipe, and means rotatably connecting each of said two ends to said supporting means so that said helical spring will rotate as it is moved along the cylindrical surface of said pipe held by said supporting means.

11. An electrical probing device for applying a testing potential along the surface of a coated pipe comprising a substantially semi-circular yoke member having a projection at each of its two ends extending approximately along the diameter of said semi-circle, a shaft fixed substantially perpendicular to each of said two projections each having a rotatable member thereon, a helical coiled spring extending along said yoke and having each of its ends fixed respectively to each of said rotatable members so that said helical spring is thus rotatably mounted on said yoke, and handle means affixed to and extending from said yoke member.

12. An electrical probing device as defined in claim 11 in which said yoke member has guide members extending from said yoke and embracing said spring to hold said spring in position with respect to said yoke.

13. An electrical probing device as defined in claim 11 in which said projections extend inwardly with respect to said semi-circular yoke member and said spring is embraced thereby.

14. An electrical probing device as defined in claim 11 in which said projections extend outwardly with respect to said semi-circular yoke member and said spring extends along the outer circumference of said yoke.

LEO H. TINKER.

REFERENCES CITED

The following references are of record in the file of this patent:

UNITED STATES PATENTS

| Number | Name | Date |
|---|---|---|
| 1,779,907 | Dye | Oct. 28, 1930 |
| 1,941,732 | Austin | Jan. 2, 1934 |
| 2,177,528 | Kidd | Oct. 24, 1939 |
| 2,332,182 | Stearns | Oct. 19, 1943 |
| 2,379,047 | Thomas | June 26, 1945 |
| 2,497,804 | Stearns | Feb. 14, 1950 |